United States Patent [19]

Murray et al.

[11] Patent Number: 5,797,106
[45] Date of Patent: Aug. 18, 1998

[54] METHOD AND APPARATUS FOR AN IMPROVED FLIGHT MANAGEMENT SYSTEM PROVIDING FOR LINKING OF AN OUTBOUND COURSE LINE FROM A PREDETERMINED POSITION WITH AN EXISTING FLIGHT PLAN

[75] Inventors: Daniel J. Murray, Mill Creek; John C. Griffin, III, Tacoma; Bruce L. Turner, Lynnwood; Peter D. Gunn; Thomas E. Twiggs, both of Bellevue; Henry V. VonJouanne, Renton; George W. Schraw, Federal Way; Ann M. Tracy, Everett, all of Wash.

[73] Assignee: The Boeing Company, Seattle, Wash.

[21] Appl. No.: 625,672

[22] Filed: Mar. 29, 1996

[51] Int. Cl.⁶ .................................................. G06F 165/00
[52] U.S. Cl. ........................... 701/11; 701/202; 701/206
[58] Field of Search ............................. 701/200, 202, 701/206, 3, 4, 11; 244/175; 73/178 R

[56] References Cited

U.S. PATENT DOCUMENTS

| | | |
|---|---|---|
| 3,777,123 | 12/1973 | Games . |
| 3,786,505 | 1/1974 | Rennie . |
| 4,086,632 | 4/1978 | Lions . |
| 4,220,994 | 9/1980 | Hendrickson . |
| 4,231,093 | 10/1980 | LaVance et al. . |
| 4,367,453 | 1/1983 | Kuno et al. . |
| 4,692,869 | 9/1987 | King et al. . |
| 4,811,230 | 3/1989 | Graham et al. . |
| 4,812,990 | 3/1989 | Adams et al. . |
| 4,999,782 | 3/1991 | BeVan . |
| 5,047,946 | 9/1991 | King et al. ........................ 701/206 |
| 5,340,061 | 8/1994 | Vacquier et al. . |
| 5,369,589 | 11/1994 | Steiner . |
| 5,398,186 | 3/1995 | Nakhla . |
| 5,450,343 | 9/1995 | Yurimoto et al. . |
| 5,646,854 | 7/1997 | Bevan ............................... 701/206 |
| 5,715,163 | 2/1998 | Bang et al. ....................... 701/206 |

FOREIGN PATENT DOCUMENTS

0 516 501 A  5/1992  European Pat. Off. .

*Primary Examiner*—Gary Chin
*Attorney, Agent, or Firm*—James P. Hamley

[57] ABSTRACT

An improvement to an aircraft flight management system allows the flight crew to enter a predetermined position, which may be either the aircraft's current position or a defined waypoint, and a course line, or vector from the predetermined position. The system responds by displaying to the flight crew the predetermined position and course line, and then proceeds to link the course line to the existing flight plan. The flight crew may then either execute the modified flight plan or erase the modification and enter an alternate plan. The procedure of entering the predetermined position and course line, and linking to the existing flight plan may all be done with the autopilot activated, whereby appropriate lateral navigational signals are generated and supplied to the autopilot flight director to direct the aircraft along the newly specified route. In addition, accurate performance data, such as distance to go, estimated time of arrival, and fuel remaining at each waypoint are displayed to the flight crew.

6 Claims, 8 Drawing Sheets

METHOD AND APPARATUS FOR AN IMPROVED FLIGHT MANAGEMENT SYSTEM PROVIDING FOR LINKING OF AN OUTBOUND COURSE LINE FROM A PREDETERMINED POSITION WITH AN EXISTING FLIGHT PLAN

BACKGROUND OF THE INVENTION

The present invention relates to the aircraft flight management system art and, in particular, to an improved flight management system which allows a flight crew to enter an outbound course line from a predetermined position and then link the outbound course line to the remaining flight plan, all without disengaging an associated autopilot.

In modern commercial aircraft, a flight crew makes flight plan entries and modifications through a Flight Management System—Control Display Unit (FMS-CDU). The FMS-CDU is an electronic module containing a keyboard on its lower face half and an electronic display on its upper face half. By keying entries into the keyboard, the flight crew can build or modify a route into the Flight Management Computer by typing in a series of waypoints which are then displayed, in text form, on the upper half of the FMS-CDU display.

An additionally provided display is a navigation (map) display. In contrast to the text display of the FMS-CDU, the navigation display graphically depicts the selected waypoints along a desired route. Thus, as the flight crew types entries into the FMS-CDU, these are then displayed graphically on the navigation display.

Current FMC's provide for construction of a variety of flight plans, consisting of dot-to-dot leg segments and procedural maneuvers. There are, however, no provisions for creating a flight plan that corresponds to an Air Traffic Control clearance such as ". . . clear to intercept the 120° radial from waypoint ABC, resume flight plan route". Thus, an FMC capability to create an outbound vector from a flight plan waypoint and link that vector to the remaining flight plan and provide lateral navigation (LNAV) guidance so that the route can be flown with the autopilot engaged would be a desirable feature.

Most commercial airliners can be flown on a constant heading with the autopilot engaged. This allows interception and tracking of a course outbound from a geographical waypoint. However, constant adjustment to the airplane heading are necessary due to the effect of wind on the flight plan to maintain the desired course. One existing autopilot flight system has the capability to generate guidance and fly a Voice Omnirange Receiver (VOR) outbound course, but this capability is limited to VOR's. With these prior existing systems, the FMC computations for estimated time of arrival (ETA) and fuel at destination are not precise, since direct flight is assumed by the FMC, where flight planned route segments do not exist.

SUMMARY OF THE INVENTION

It is an object of this invention, therefore, to provide an improved aircraft flight management system which allows the flight crew to enter an outbound course line from a predetermined position and then link the outbound course line to the existing flight plan.

It is a particular object of the present invention to provide the above-improved flight management system which allows entry of a predetermined position and outbound course line and linking to the existing flight plan, all with the autopilot engaged.

Briefly, in an aircraft flight management system which includes a control display unit (CDU) and an autopilot, and wherein a flight crew enters a predetermined flight plan and engages an autopilot which provides navigation control signals to fly the aircraft along the flight plan, an improvement allows the flight crew to enter an outbound course line from a predetermined position and link the outbound course line to the remaining flight plan, all without disengaging the autopilot. The improvement includes a data entry device to permit the flight crew to enter the predetermined position and outbound course line. Provided logic control responds to the data entry device to:

a) display the predetermined position and outbound course line on the CDU;

b) create a flight plan discontinuity between the course line and the remainder of the predetermined flight plan;

c) create a flight plan modified state reflecting the course line and the predetermined position;

d) permit the flight crew to accept the flight plan modified state and continue with operation e), otherwise permitting the flight crew to enter a new course in the CDU;

e) determine if the course line intersects a downstream flight leg of the predetermined flight plan and, if it does not, continuing with item h) below, otherwise;

f) permit the flight crew to enter the end point of the downstream intersecting flight leg;

g) link the course line to the intersection with the downstream flight leg of the modified flight plan;

h) permit the flight crew to accept the modified flight plan, in which event proceeding to i) generate guidance signals to direct the autopilot to fly the aircraft along the modified flight plan.

In a particular aspect of the above improved flight management system, the data entry device and logic control include means for allowing the flight crew to enter a predetermined waypoint as the predetermined position.

In yet a further aspect of the above improvement to a flight management system, the data entry device and logic control include means for allowing the flight crew to enter the aircraft's present position as the predetermined position.

DETAILED DESCRIPTION

Figure 1:
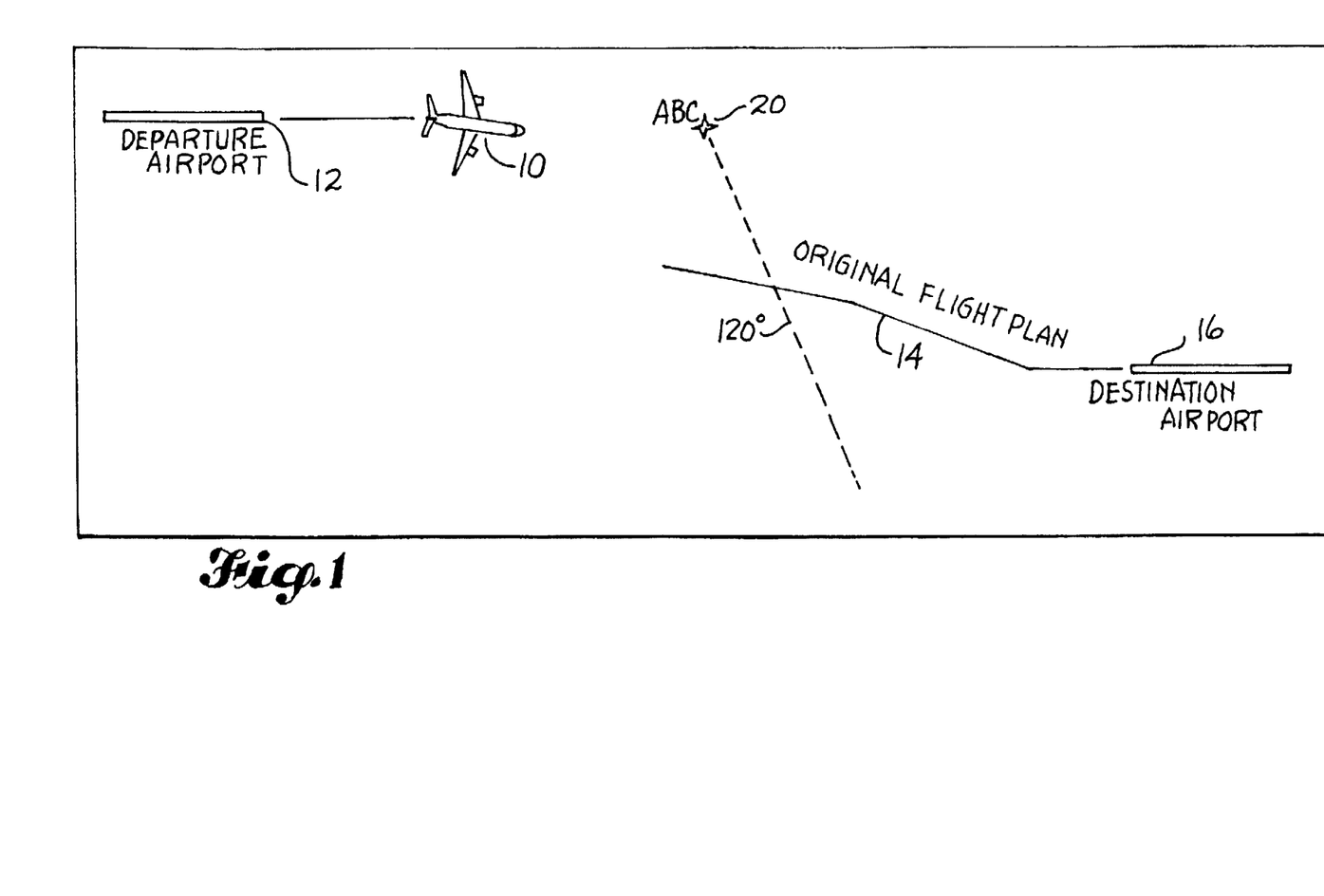
FIG. 1 depicts an aircraft being directed to fly a given vector from a specified waypoint as a modification to the aircraft's original flight plan.

FIG. 1 is a diagram illustrating an aircraft 10 shown flying from the runway 12 of a departure airport. Using the aircraft's flight management system, the flight crew entered an original flight plan 14 which leads them to the runway 16 of a destination airport.

En route, the aircraft 10 may be given a direction from Air Traffic Control such as ". . . clear to intercept the 120° radial from ABC, resume flight plan route", where ABC is a predetermined waypoint identified by the aircraft's navigation system.

Prior to the present invention, commercial airliners could be flown on a constant heading with the autopilot engaged. This allows interception and tracking of a course outbound from a geographical waypoint, however, constant adjustments to the airplane heading have been necessary, due to the effect of wind on the flight path, to maintain the desired course. With these prior systems, computations made by the flight management system for estimated time of arrival (ETA) and fuel at destination are not precise, since direct flight is assumed by the flight management system, where flight plan route segments do not exist.

Figure 2:
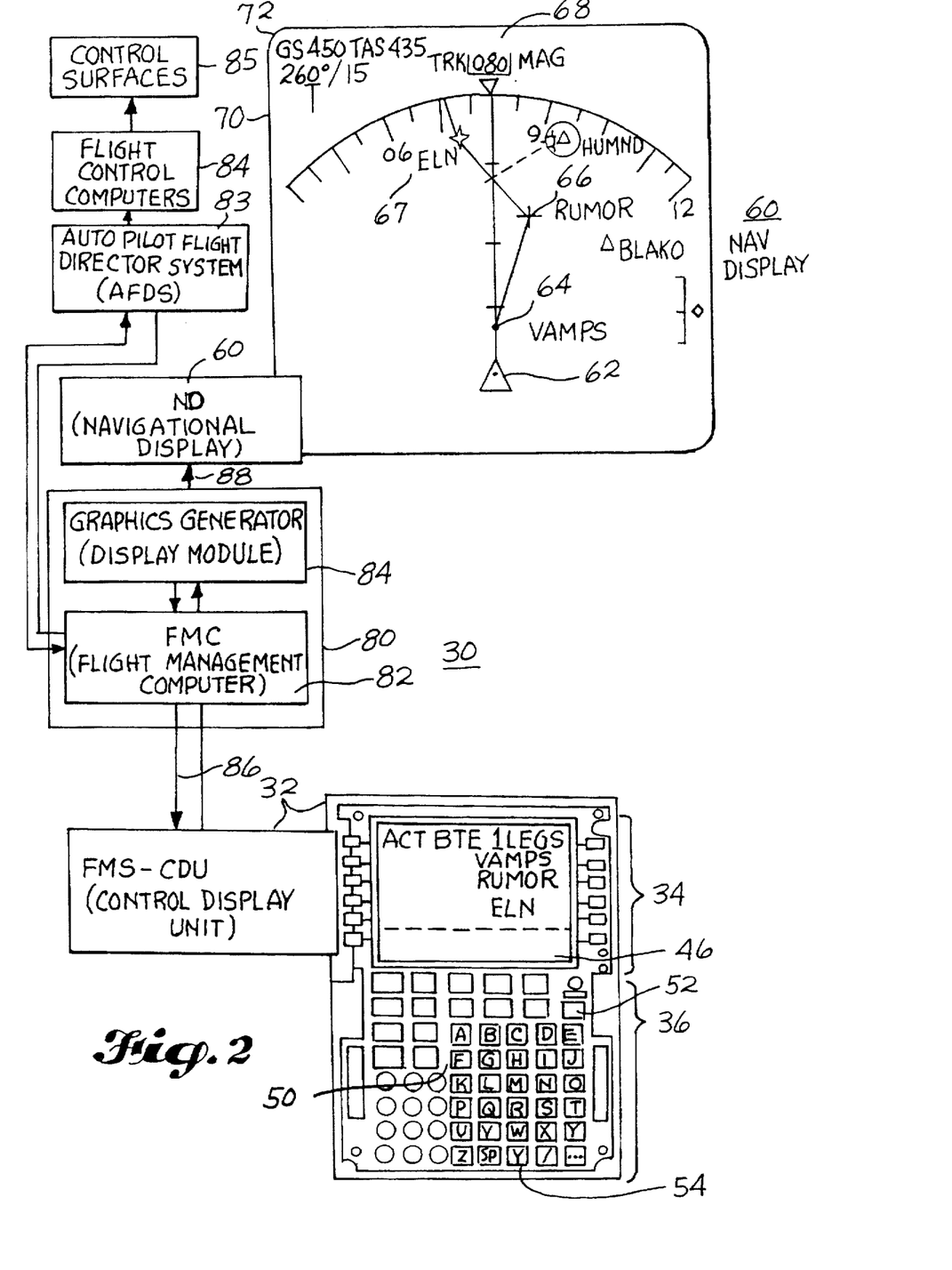
FIG. 2 is a diagram illustrating the general appearance and relative interconnection of the flight management system including the control display unit (CDU), navigation display, and logic module in accordance with the preferred embodiment of the invention.

FIG. 2 illustrates in both graphic and block diagram form the primary components of a modern commercial aircraft flight management system, indicated generally at 30. Shown at 32 is a conventional aircraft navigational Flight Management System —Control Display Unit (FMS-CDU). The FMS-CDU 32 includes an upper face portion 34 and a lower face portion 36. In its upper face portion 34, the FMS-CDU 32 includes an electronic display 40 which is capable of displaying lines of text entered by the flight crew. These lines of text depict, typically, waypoints along the path of a desired navigational route. On both sides of, and adjacent to the electronic display 40 are line select keys, indicated generally at 42 and 44. Upon the user activating one of the line select keys 42, 44, the adjacent line of text on the electronic display is activated to thereby allow entry, selection or deletion of text.

At the lower portion of the electronic display is a scratch pad line 46 which displays system generated messages, entries via the keyboard (described below), and data being moved from one line to another.

In the lower face half 36 of the FMS-CDU 32 is a keyboard, indicated generally at 50. The keyboard 50 includes an array of keys as well as control inputs by which the flight crew can manually enter waypoints, which then appear on the electronic display 40 as text line items. Also included are various control keys which allow the flight crew to add, modify and delete various entries.

For example, a provided Execute key 52 is a momentary action push button which becomes illuminated to indicate a modification to the active route. Upon the flight crew pushing the Execute key 52, a desired modification is activated and illumination of the key is extinguished.

A provided Delete key 54 is a momentary action switch which, when activated by the flight crew enters DELETE in the scratch pad portion 46 of the electronic display 40. When the scratch pad is blank, a selection of a subsequent line by the line select keys 42, 44 deletes data on the corresponding adjacent line if such information is deletable.

Thus, by way of typed entries via the keypad 50, the flight crew enters waypoints along the desired navigational route. These waypoints are displayed as lines of text on the electronic display 40.

Also provided as a display to the flight crew of the desired navigational route is a navigation display 60. The navigation display 60 depicts the current position of the aircraft, herein indicated by the triangle 62, and selected waypoints along the desired route such as the indicated waypoint "VAMPS" at 64, the next selected waypoint "RUMOR" at 66 and the final waypoint "ELN" at 67.

In addition to the route information, also depicted on the navigation display 60 is the current magnetic track heading 68 and an arcuent line 70 which depicts a portion of a compass rose.

Also depicted in the upper left hand corner of the display 60 is information indicating the current ground speed, true air speed, wind speed and wind heading information, collectively shown at 72.

The navigation display 60 and the FMS-CDU 32 interconnect through a logic module indicated generally at 80. The logic module 80 includes a flight management computer (FMC) 82. In addition, the logic includes the graphics generator (display module), 84. Inputs from the logic module 80 to and from the FMS-CDU 32 are carried along a two-way bus 86, whereas display information from the graphics generator 84 are carried to the navigation display 60 via a one-way bus 88.

The flight management computer 82 provides lateral (LNAV) and vertical (VNAV) guidance signals to the Autopilot Flight Director System (AFDS) 83 which validates and acknowledges the guidance signals. The AFDS in turn provides guidance signals to the Flight Control Computer (FCC's) 84 which activate the aircraft's control surface 85 in the normal manner such that the aircraft is directed to automatically fly the route as selected by the flight management computer 62.

By the present invention, the flight crew is permitted to enter a position and outbound course line into the flight plan, whereby the system links the outbound course line to the existing flight plan, all with the autopilot engaged.

Figure 3A:
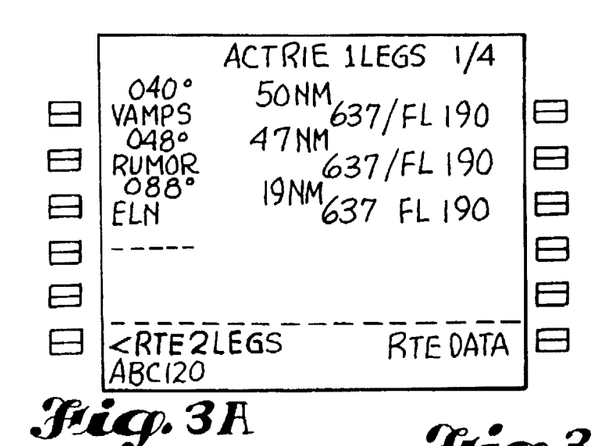
FIGS. 3A, 3B, and 3C illustrates the initial state of the CDU (3A), the entry of a new point and course line in the CDU display (3B) and the resulting depiction on the navigation display (3C)

Thus, referring to FIG. 3, shown in FIG. 3A is the CDU active (ACT) display of the route 1 legs page. Shown entered in the scratch pad is the entry ABC 120 representative of a specified waypoint ABC and an outbound course vector at 120°. A "route DISCONTINUITY" is created by the system between the new entry "ABC 120" and the original waypoint VAMPS."

Figure 3B:
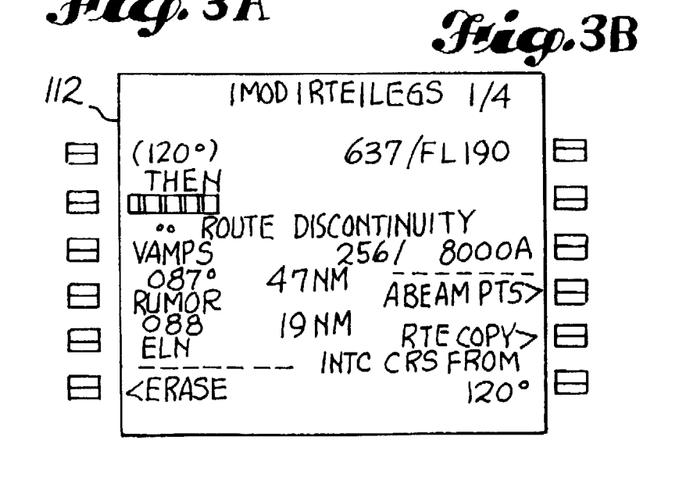

In the CDU display of FIG. 3B, the entry "ABC 120" has been entered into the top line of the route 1 legs of the CDU (displayed as "(120°)"), creating a course vector beginning at waypoint ABC, in a direction of 120°.

Figure 3C:
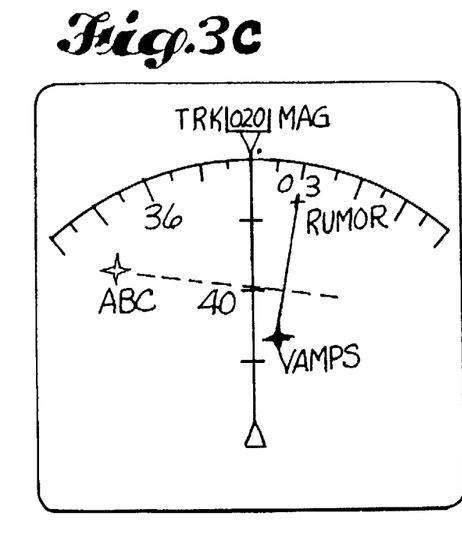

FIG. 3C depicts the navigation display which now automatically indicates a course line at 120° radiating from the waypoint ABC.

Figure 4A:
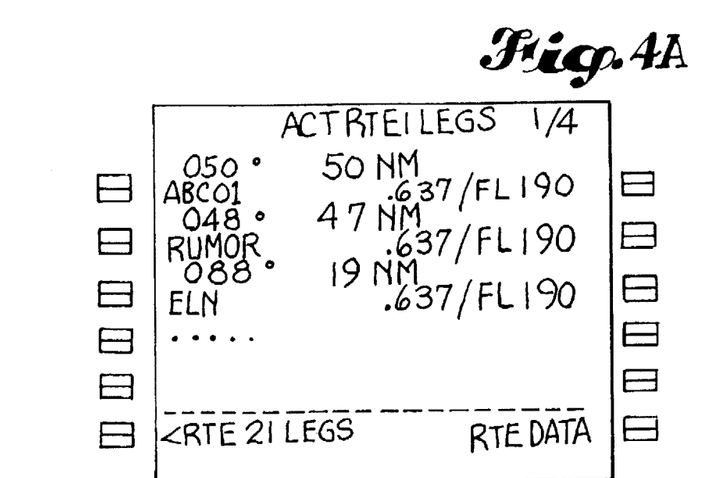
FIGS. 4A and 4B illustrates the CDU display linking the new course line to the original flight plan (4A) and resulting navigation display (4B)
Figure 4B:
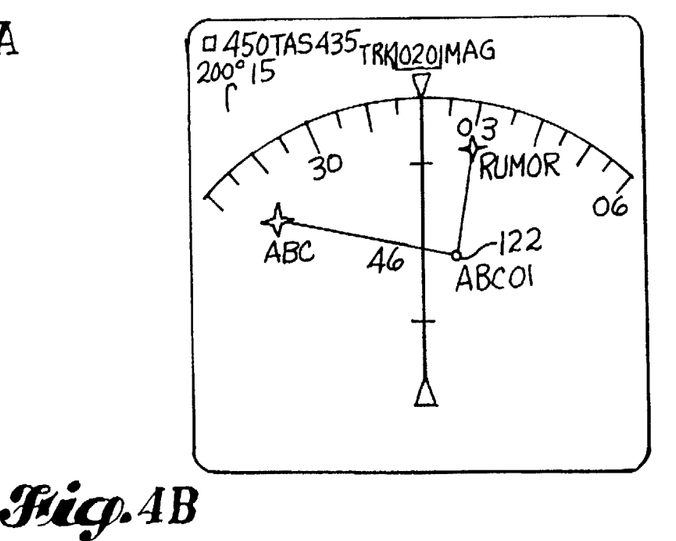

FIGS. 4A and 4B illustrate the CDU and navigation display depictions, respectively, for linking of the new waypoint and course line into the existing navigational route. Here, in FIG. 4A, the 120° vector has been linked to the original flight plan by entering the waypoint "RUMOR" into the boxes on line 2 of the CDU and creating the new intersection waypoint ABC01.

In FIG. 4B, the waypoint ABC, with the vector at 120° is shown intersecting the old flight plan at the new intersection point ABC01.

Figure 5:
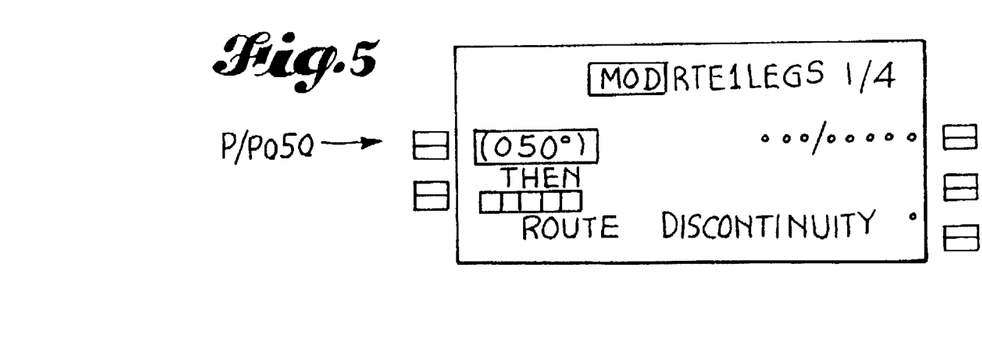
FIG. 5 depicts entry in the CDU of a course line from the aircraft's present position.

FIG. 5 illustrates entry into the CDU of an intercept course from the aircraft's current position as opposed to a specified waypoint by entry into the first line of the CDU of a command "P/Pxxx", where xxx is the desired course. The present position vector may also be linked to the original flight plan as described above. In the example of FIG. 5, a course vector of 50° has been entered, thereby indicating a course line of 50° from the aircraft's current position.

Figure 6:
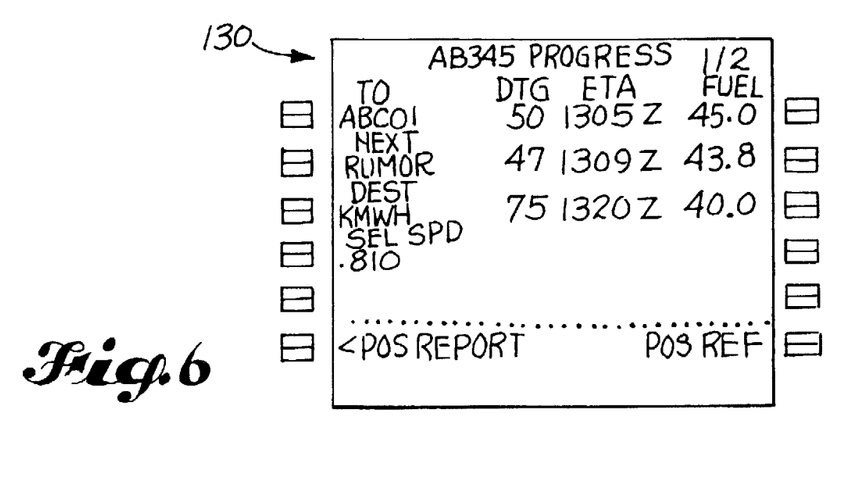
FIG. 6 depicts the CDU display with performance data displayed on the progress page.

Since the autopilot is engaged during the course of entering the new predetermined position and outbound course line, FIG. 6 depicts the CDU display which includes performance calculations for the newly created route. Thus, shown are the distance to go (DTG) to the next waypoint, estimated time of arrival (ETA) to the various waypoints and projected fuel remaining (in 1,000 pound units) upon reaching the indicated waypoints. These ETA and fuel predictions for in route waypoints and the destination are based on direct flight to the course intercept point and then along the newly created route to the destination. Thus, by the present invention, the flight crew automatically receives accurate performance data corresponding to the newly created flight plan.

Figure 7A:
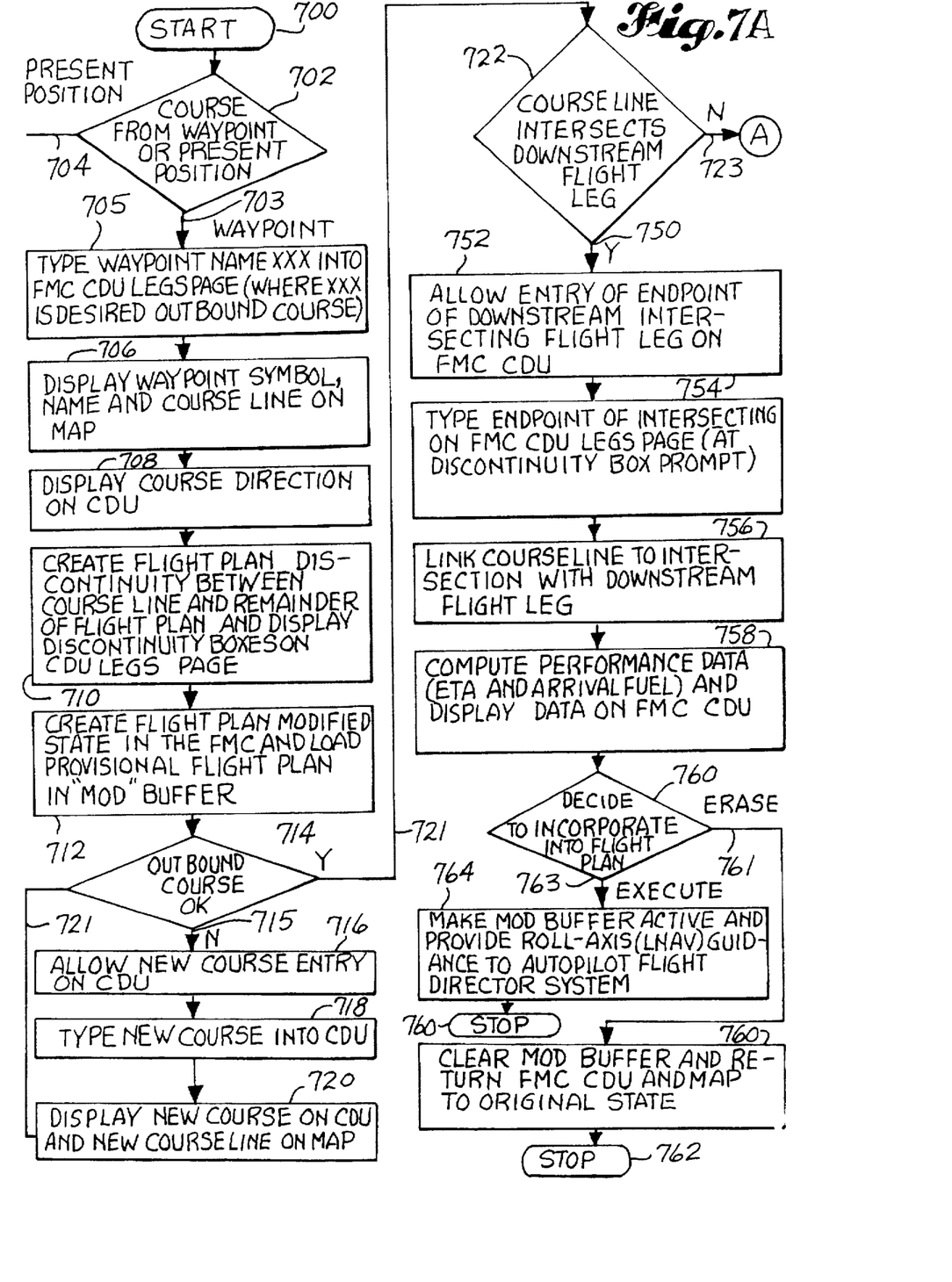
FIGS. 7A–C are logic flow diagrams illustrating the logical sequence performed by the logic control device within the flight management system to allow the flight crew to enter a position and course line and link the position and course line to the existing flight plan, with the autopilot engaged.
Figure 7B:
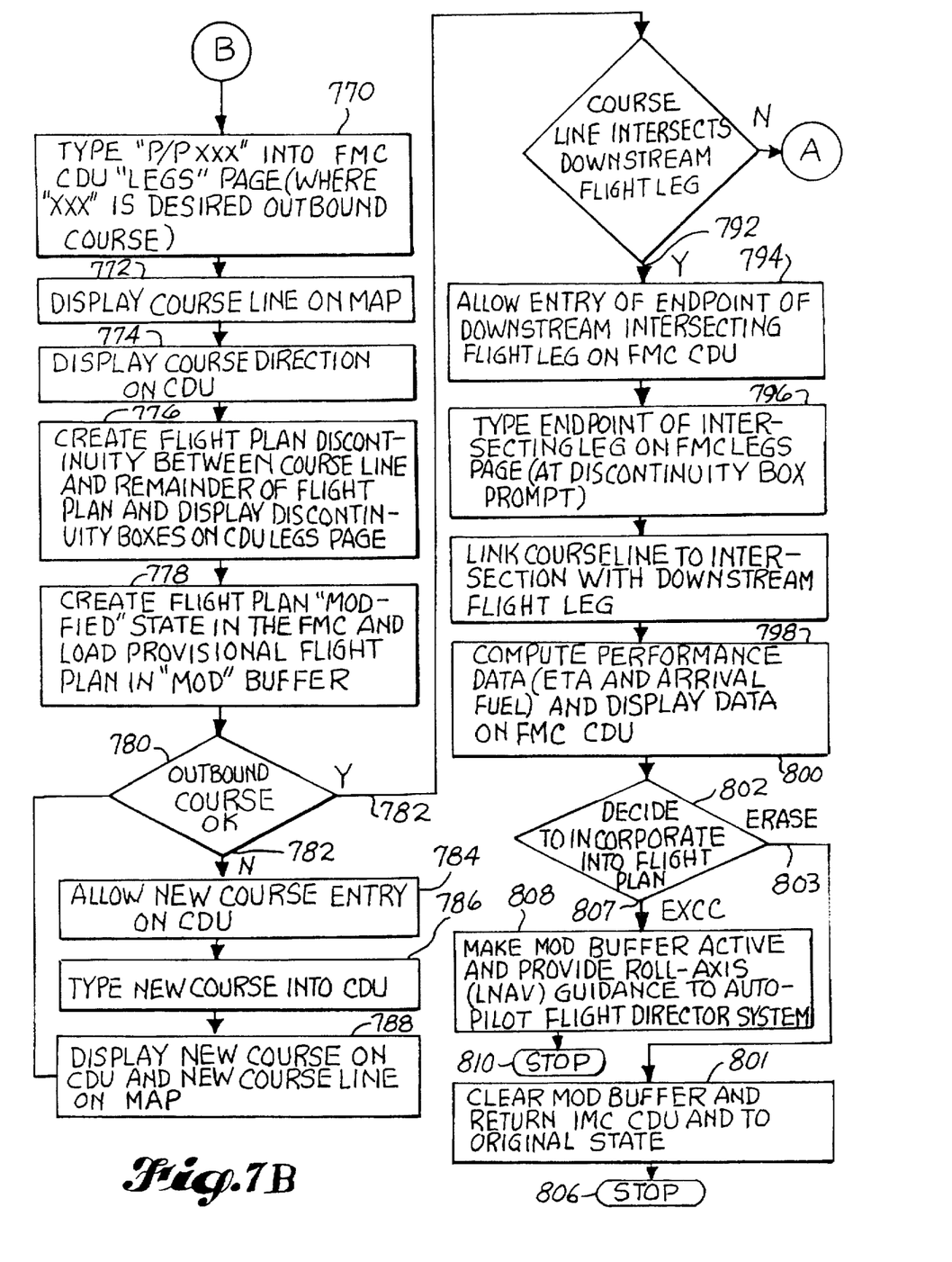
Figure 7C:
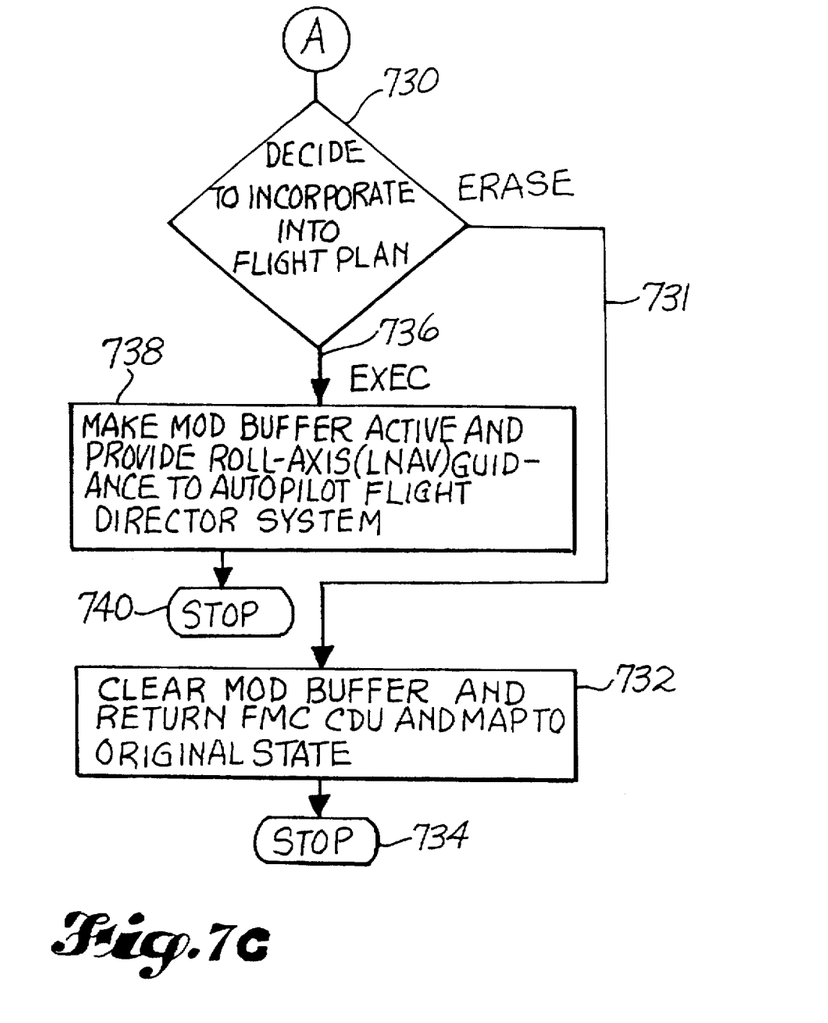

FIGS. 7A–C set forth logic flow diagrams detailing the logical sequence performed by the logic control unit of the flight management system to realize the functionality according to the preferred embodiment of the invention. The system starts at start block 700. At decision point 702 the flight crew is given the opportunity to enter a desired course modification from a given waypoint, direction line 703, or from the aircraft's present position, direction 704.

If the flight crew selects a course modification from a specified waypoint, the system enters block 706 and the flight crew enters a waypoint name "xxx" into the flight management computer CDU legs page. Then, at 708, the system displays the course direction on the CDU. At block 710 the system creates a flight plan discontinuity between the course line and the remainder of the flight plan and displays this discontinuity as a sequence of boxes on the CDU legs page.

At block 712, the flight management system creates a flight plan modified state in the flight management computer and loads the provisional flight plan into a "mod" buffer.

At decision block 714 the flight crew is given the opportunity to either approve or disapprove the outbound course entry. If the flight crew disapproves the outbound course entry, via direction 715, the system enters block 716 to allow the entry of a new course in the CDU. The flight crew may then, at block 17, type in the new desired course. The system will then, at block 720, display the new course on the CDU and present a new course line on the navigational map display. The system then, via direction line 721, allows the flight crew to accept or reject this newly entered course.

However, if out of decision block 714, the flight crew decides to accept the entered outbound course, the system, via direction line 721, enters a decision block 722. Decision block 722 determines whether or not the newly entered course line intersects the downstream flight leg of the originally entered flight plan. If the course line does not intersect the downstream flight leg of the presently entered flight plan, a direction path 723 directs the system to a logic sequence as depicted in FIG. 7C. Here, the system enters a decision block 730 wherein the flight crew is given the option to incorporate a new outbound course line into the flight plan. If the flight crew does not wish to incorporate the new course line into the flight plan, it selects an erase route, indicated by direction line 731, which enters block 732. At block 732, the system clears the "mod" buffer and returns the flight management computer CDU and map display to its original state. This completes the process, whereby the system enters a stop mode state 734.

However, if, out of decision block 730, the flight crew decides to execute the modified flight plan, an execute direction 736 is taken, activating the system to block 738. At block 738, the "mod" buffer stored flight plan is made active and roll axis (LNAV) guidance is provided to the autopilot flight director system to thereby fly the aircraft along the new desired route. This having been done, the system enters a stop mode 740.

Returning to FIG. 7A, if out of decision block 722 the system determines that the newly entered course line does intersect the downstream flight leg of the original flight plan, a direction line 750 takes the system into a logic block 752. At logic block 752, the system allows the flight crew to enter an end point of the downstream intersecting flight leg to the original flight plan on the flight management computer CDU.

The flight crew then, at block 754, types the end point of the intersection leg on the flight management computer CDU legs page at the discontinuity box prompt.

In response to this entry, the system, at box 756, links the new course line to the intersection with the downstream flight leg.

At block 758, the system then computes performance data (estimated time of arrival and arrival fuel level) and displays this data on the flight management computer CDU.

Out of logic block 758, the flight crew at decision block 760 can decide whether or not to incorporate this modification into the flight plan. If, via direction leg 761, the flight crew rejects the modification, an erase command is issued which, entering block 762, causes the "mod" buffer to be cleared and the flight management computer CDU and map display are returned to the original state. The system then enters a stop mode 762.

However, if out of decision block 760, the flight crew decides to execute the modified flight plan, via direction leg 763, a block 764 is entered. At logic block 764, the system makes the "mod" buffer active and provides roll axis (LNAV) guidance signals to the autopilot flight director system to direct the airplane to fly along the new flight path. Out of block 764, a stop mode is executed at block 766.

Returning to decision block 702, if the flight crew desires to enter a course line from the aircraft's present position, a direction line 704 is followed to the logic step set forth in FIG. 7B. Here, the flight crew at logic block 770 can type the command "P/Pxxx" into the flight management computer CDU legs page, where "xxx" is the desired outbound course. The system then responds at 772 by displaying this course line on the navigational display or map.

Also, at 774 the system displays the course direction on the CDU.

Then, at logic block 776, the system creates a flight plan discontinuity between the course line and the remainder of the flight plan and displays discontinuity as a sequence of boxes on the CDU legs page.

At 778, the system creates a flight plan "modified" state in the flight management computer and loads the provisional flight plan into the "mod" buffer.

The flight crew is then afforded the opportunity to decide at decision block 780 whether the newly entered course is acceptable, in which case direction line 781 is taken or unacceptable, in which event direction line 782 is implemented. If the flight crew at decision block 780 decides that the new course is not acceptable, the system, at block 784, allows entry of a new course on the CDU. The flight crew, at block 786, may then type in the new, desired course into the CDU. The system responds at block 788 by displaying this new course on the CDU and a new course line on the navigation display, or map, thereafter returning to decision block 780 for review by the flight crew, via direction line 789.

If, at decision block 780, the flight crew decides to accept the modified course, via direction line 781, the system enters a decision block 790 to determine whether or not this new course line intersects the downstream flight leg of the originally entered flight plan. If this new course line does not intersect a downstream flight leg of the original flight plan, the system, via direction line 781, enters the routine previously described above and set forth in detail in FIG. 7C.

However, if the course line does intersect the downstream flight leg of the originally entered flight plan, it passes via direction line 792 to a logic block 794. In logic block 794, the system allows the flight crew to enter the end point of the new course line where it intersects the downstream portion of the flight leg on the flight management computer CDU. The flight crew, at block 796, enters the end point of the intersecting leg on the FMC legs page, at the discontinuity box prompt.

The system responds at block 798 by linking the course line to the intersection with the downstream flight leg. Then, at block 800, the system computes the performance data, i.e., estimated time of arrival and arrival fuel level, and displays this data on the flight management computer CDU.

Now, at decision block 802, the flight crew decides whether or not to incorporate the modified route into the flight plan. If, via decision line 803, the flight crew decides to reject the modification, an erase command causes block 804 to be entered. At block 804 the system clears the "mod" buffer and returns the flight management computer CDU and the navigation display map to its original state. The system then enters a stop mode 806.

If, however, the crew decides at 802 to execute the modified flight plan, the system, via an execute decision line 807, enters block 808. At block 808, the system makes the "mod" buffer active and provides roll axis (LNAV) guidance signals to the autopilot flight director system to thereby direct the aircraft to fly the new course. Finally, the system enters the stop mode, at 810.

In summary, disclosed is an improvement to an aircraft flight management system. The improvement allows the flight crew to enter a predetermined position, whether current position of the aircraft or a specified waypoint, and a course line from the predetermined position. The system then responds by linking the outbound course line from the predetermined position to the remainder of the flight plan. This is all done with the autopilot active, such that accurate performance data, including estimated time of arrival and fuel level at arrival are maintained and displayed to the flight crew.

While a preferred embodiment of the invention has been described in detail, it should be apparent that many modifications and variations thereto are possible, all of which fall within the true spirit and scope of the invention

What is claimed is:

1. In an aircraft flight management system including a control display unit (CDU) and an autopilot wherein a flight crew enters a predetermined flight plan and engages an autopilot which provides navigation control signals to fly the aircraft along said flight plan, an improvement allowing the flight crew to enter an outbound course line from a predetermined position, linking said outbound course line to the remaining flight plan, all without disengaging the autopilot, the improvement comprising:

data entry means for permitting the flight crew to enter said predetermined position and outbound course line; and logic control means responsive to said data entry means to:
   a) display said predetermined position and outbound course line on the CDU;
   b) create a flight plan discontinuity between said course line and the remainder of said predetermined flight plan;
   c) create a flight plan modified state reflecting said course line and said predetermined position;
   d) permit the flight crew to accept said flight plan modified state and continue with e) below, otherwise permitting the flight crew to enter a new course in the CDU;
   e) determine if said course line intersects the downstream flight leg of the predetermined flight plan and, if it does not, continuing with step h) below, otherwise
   f) permit the flight crew to enter the endpoint of the downstream intersecting flight leg;
   g) link said course line to said intersection with the downstream flight leg of the modified flight plan;
   h) permit the flight crew to accept said modified flight plan, in which event proceeding to
   i) generate guidance signals to direct the autopilot to fly the aircraft along said modified flight plan.

2. The improvement of claim 1 wherein said data entry means and logic control means include means for allowing the flight crew to enter a predetermined way point as said predetermined position.

3. The improvement of claim 1 wherein said data entry means and logic control means include means for allowing the flight crew to enter the aircraft's present position as said predetermined position.

4. In an aircraft flight management system including a control display unit (CDU) and the autopilot wherein a flight crew enters a predetermined flight plan and engages an autopilot which provides navigation control signals to fly the aircraft along said flight plan, an improved method for allowing the flight crew to enter an outbound course line from a predetermined position, lining said outbound course line to the remaining flight plan, all without disengaging the autopilot, the improved method comprising the steps of:

a) providing data entry means for permitting the flight crew to enter said predetermined position and outbound course line;
   b) displaying said predetermined outbound course line on the CDU;
   c) creating a flight plan discontinuity between said course line and the remainder of said predetermined flight plan;
   d) creating a flight plan modified state reflecting said course line and said predetermined position;
   e) permitting the flight crew to accept said flight plan modified state and continuing with step f) below, otherwise permitting the flight crew to enter a new course in the CDU;
   f) determining if said course line intersects the downstream flight leg of the predetermined flight plan and, if it does not, continuing with step i) below, otherwise,
   g) permitting the flight crew to enter the end point of the downstream intersecting flight leg;

h) linking said course line to said intersection with the downstream flight leg to produce a modified flight plan;

i) permitting the flight crew to accept said modified flight plan, in which event j) generating guidance signals to direct said autopilot to fly the aircraft along said modified flight plan.

5. The improved method of claim 4 when the step of providing data entry means for permitting the flight crew to enter said predetermined position and outbound course line include the further step of allowing the flight crew to enter a predetermined way point as said predetermined position.

6. The improved method of claim 4 wherein the step of providing data entry means for permitting the flight crew to enter said predetermined position and outbound course line includes the further step of permitting the flight crew to enter the aircraft's present position as said predetermined position.

* * * * *